United States Patent

Beichler et al.

[11] Patent Number: 5,052,023
[45] Date of Patent: Sep. 24, 1991

[54] METHOD AND APPARATUS FOR RECEIVED SIGNAL EQUALIZATION

[75] Inventors: Richard A. Beichler, Madison; Steven Blackwell; David P. Nelson, both of Huntsville, all of Ala.

[73] Assignee: Motorola, Inc., Schaumburg, Ill.

[21] Appl. No.: 556,237

[22] Filed: Jul. 20, 1990

[51] Int. Cl.$^5$ .............................................. H03H 7/30
[52] U.S. Cl. ......................................... 375/12; 333/18; 364/724.2
[58] Field of Search ....................... 375/11, 12, 14, 18, 375/99, 101; 333/18, 28 R; 379/39, 414, 398; 364/724.2

[56] References Cited

U.S. PATENT DOCUMENTS

| | | | |
|---|---|---|---|
| 3,638,122 | 1/1972 | Gibson | 375/12 |
| 3,671,886 | 6/1972 | Fudemoto et al. | 375/12 |
| 4,243,956 | 1/1981 | Lemoussu et al. | 333/18 |
| 4,545,060 | 10/1985 | Arnon | 375/14 |
| 4,644,562 | 2/1987 | Kavehrad et al. | 375/101 |
| 4,759,035 | 7/1988 | McGary et al. | 333/18 |
| 4,943,789 | 7/1990 | Surie | 375/12 |

Primary Examiner—Stephen Chin
Attorney, Agent, or Firm—William E. Zitelli; Vincent B. Ingrassia

[57] ABSTRACT

A bipolar return-to-zero signal received from a communication channel (302) is sampled (402) to provide signal information that is processed (FIG. 5) to determine signal variation information. In accordance with this signal variation information, at least one operational parameter of an equalization system (400) is varied.

17 Claims, 6 Drawing Sheets

METHOD AND APPARATUS FOR RECEIVED SIGNAL EQUALIZATION

TECHNICAL FIELD

This invention relates generally to digital signal equalizers, and more specifically to those digital signal equalizers capable of varying operational parameters so as to optimize reception of a received signal.

BACKGROUND

One of the most persistent and difficult problems associated with the design and proper operation of a digital communication system is the effectiveness of equalization of the communication channel. As a practical matter, virtually every transmission media employed as a communication channel introduces some distortion into the signals travelling through the media. Typically, such distortion is caused by impedance mismatches, imperfect transmission characteristics of the media, or adverse transmission environments. For example, the communication channel commonly used by digital data services (DDS) comprises an unloaded four-wire communication channel that attenuates and band-limits information passing through the channel by an amount that varies depending upon the physical size of the wire, and the length of the communication channel. Accordingly, it is common for DDS receivers to employ some type of equalization in an attempt to counter-act the effects of the channel on the received information.

Known equalizers operate based upon a model of the communication channel. Clearly, the better the model, the more effective the equalization. However, since one model may not effectively equalize all communication channels, it is common to adjust the gain and bandwidth performance of the equalizer in a stepwise manner so as to maximize received signal amplitude. Regrettably, this process cannot effectively compensate for all possible channel variations, and may lead to equalizer adjustments that do not optimally receive information from the communication channel. Accordingly, a need exists for a more effective communication channel equalizer and more effective equalization techniques.

SUMMARY OF THE INVENTION

Briefly, according to the invention, a signal received from a communication channel is sampled to provide signal information that is processed to provide a measure of signal variation. In accordance with this signal variation information, at least one operational parameter of an equalization means is varied.

DESCRIPTION OF THE PREFERRED EMBODIMENT

Figure 1:
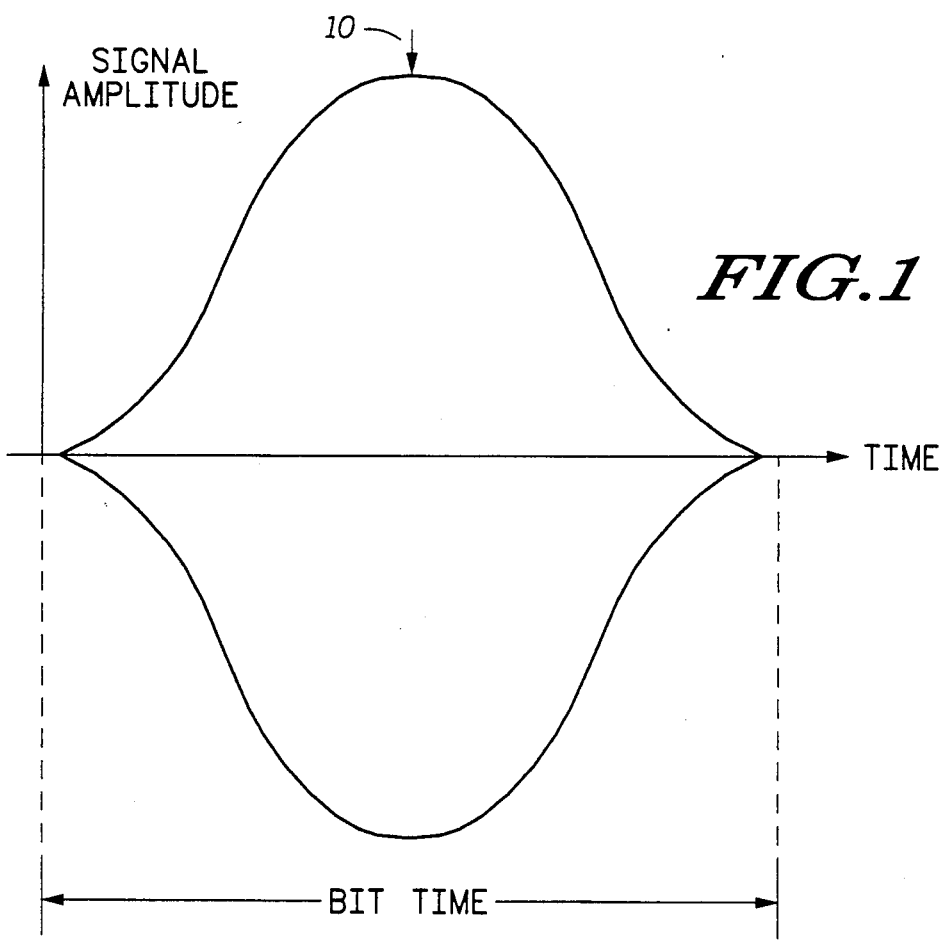
FIG. 1 is an illustration of an ideal "eye" pattern.

Referring to FIG. 1, a bipolar return-to-zero signal received from an ideal communication channel forms an undistorted "eye" pattern symmetrically positioned about a reference (zero) level. Typically, the signal bit is sampled at a sampling point 10 so as to maximize received signal amplitude. This practice facilitates a correct decision as to what information level was transmitted (i.e., logical +1, logical −1, or logical zero).

Figure 2:
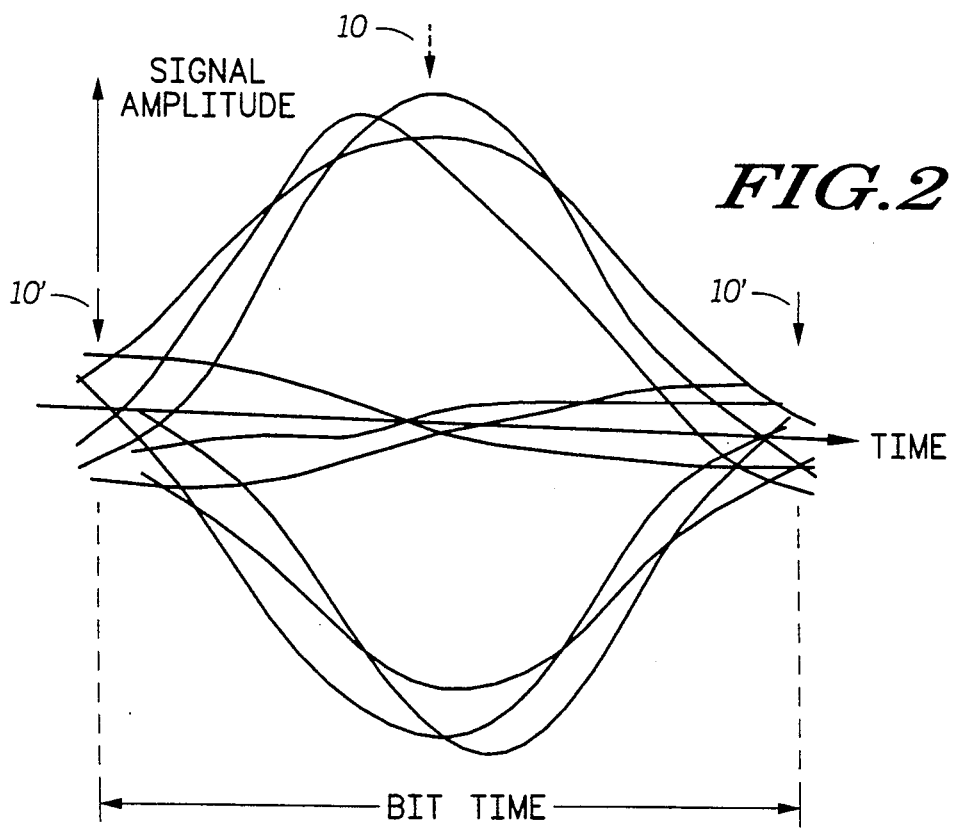
FIG. 2 is an illustration of a typical "eye" pattern.

Regrettably, FIG. 2 illustrates a more typical "eye" pattern representing information received from a non-ideal communication channel. As can be seen, the phase and amplitude of the received information has been distorted by the communication channel. Depending upon the particular channel used, and the transmission environment, the decision as to what information level was transmitted may be reduced to a mere guess, which may frustrate the effective communication of information.

Figure 3:
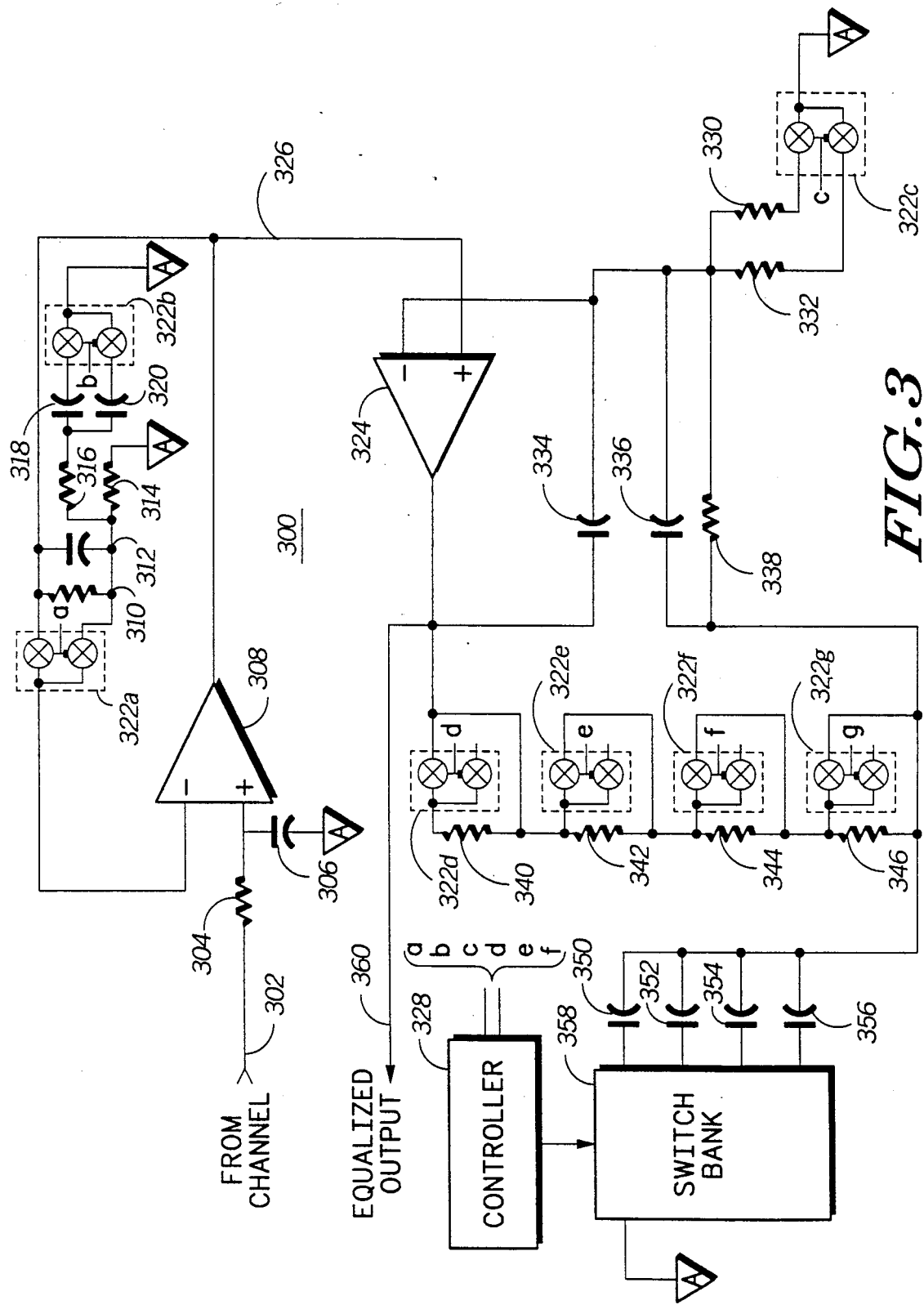
FIG. 3 is a block diagram of a signal equalizer suitable for use in the present invention.

Referring to FIG. 3, a block diagram of an equalizer 300 suitable for use with the present invention is shown. Operationally, a preferably bipolar return-to-zero signal 302 is received from a communication channel and buffered via a preferably active (308) preamplification network (304–320) that has various resistors and capacitors switched (322a and 322b) into and out-of the network so as to buffer or amplify the signal received from the communication channel.

The buffered/amplified signal 326 is filtered in a preferably active (324) filter network (330–358) that has a filter pole adjusted by switching various resistors and capacitors into and out-of the filter network (322c–322g and 358). In this way, at least one operational characteristic of the equalizer is varied by a controller 328, which preferably comprises an Intel 8031 or functional equivalent. Adjusting the filter pole modifies the equalizer bandwidth and will affect the phase and amplitude of the information signal received by all processing stages (i.e., receiver and/or decoder) following the equalizer 300.

All of the switches 322a–322g and a switching bank 358 are preferably controlled by the controller 328 with instructions stored in a memory or the like. In this way, the output 360 of the equalizer 300 is compensated to the distortion introduced by the communication channel, which in the preferred embodiment comprises an unloaded four-wire communication channel.

Naturally, the band-limits and filter pole variation possible will depend upon the values of the various resistors and capacitors used in any particular implementation of the equalizer 300. However, the resistor and capacitor values for the preferred embodiment are listed below in Table 1.

TABLE 1

| | |
|---|---|
| Resistor 304 | 2.21 k ohms |
| Capacitor 306 | .001 μ farads |
| Resistor 310 | 10 k ohms |
| Capacitor 312 | 470 Pico farads |
| Resistor 314 | 10 k ohms |
| Resistor 316 | 107 ohms |
| Capacitor 318 | .05 μ farads |
| Capacitor 320 | .0047 μ farads |
| Resistor 330 | 2.49 k ohms |
| Resistor 332 | 10 k ohms |
| Capacitor 334 | 470 Pico farads |
| Capacitor 336 | 680 Pico farads |
| Resistor 338 | 10 k ohms |
| Resistor 340 | 1.118 k ohms |
| Resistor 342 | 2.37 k ohms |
| Resistor 344 | 4.75 k ohms |
| Resistor 346 | 9.53 k ohms |
| Capacitor 350 | .027 μ farads |
| Capacitor 352 | .022 μ farads |
| Capacitor 354 | .01 μ farads |

TABLE 1-continued

| | |
|---|---|
| Capacitor 356 | .0047 μ farads |

Figure 4:
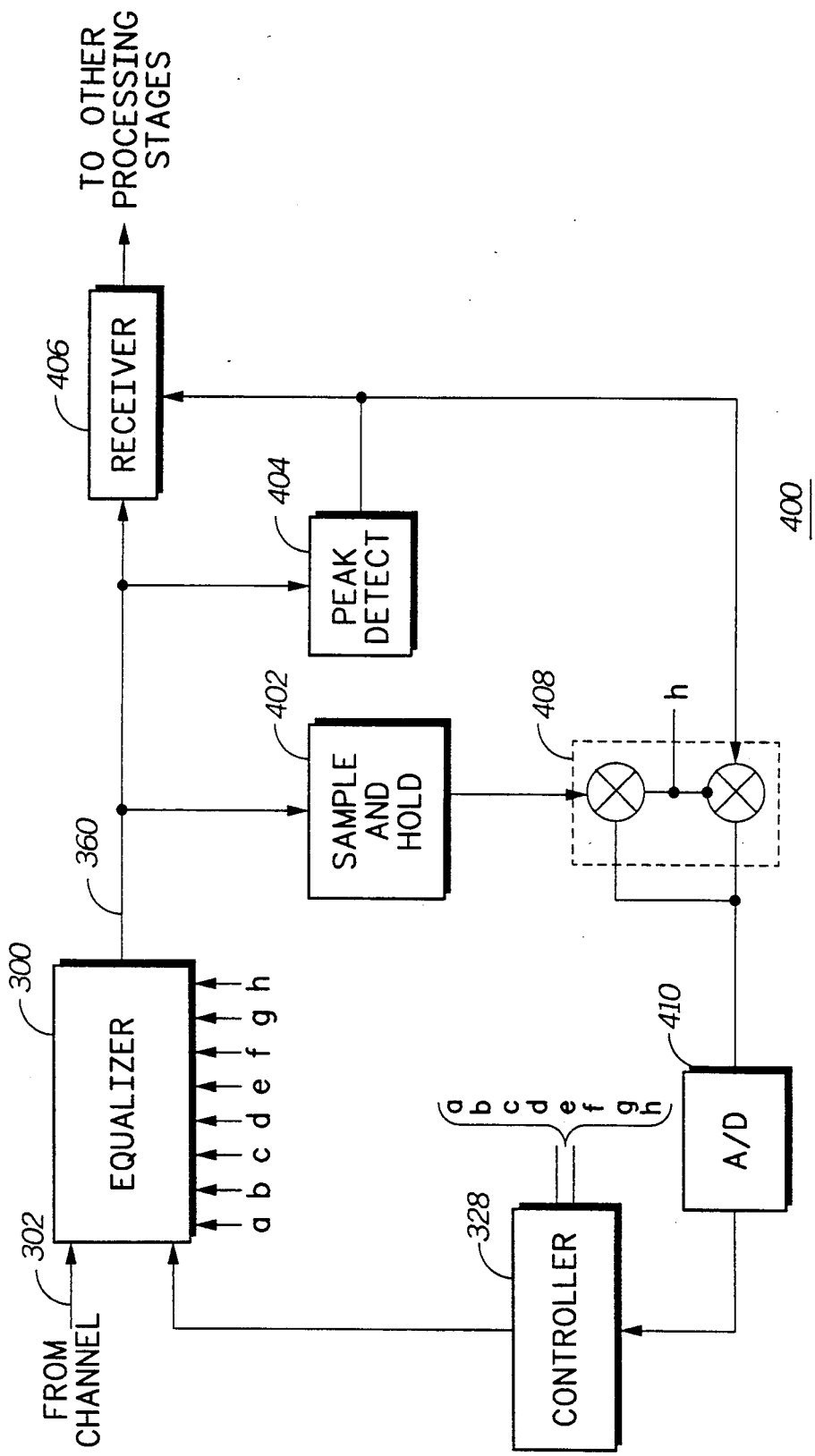
FIG. 4 is a block diagram of an equalization system in accordance with the present invention.

Referring to FIG. 4, a block diagram of an equalization system 400 in accordance with the present invention is seen to employ the equalizer 300 of FIG. 3. Accordingly, a bipolar return-to-zero signal 302 is received from the communication channel and the equalized 360 version thereof is sampled by a sample and hold circuit 402. In the preferred embodiment, sampling is performed at or near the zero-crossing points (10' of FIG. 2) where the signal variation(s) of the received information is most pronounced (reasons for the preferred sampling point will hereinafter become more apparent). The equalized signal 360 is also processed by at least one peak detector 404, which preferably operates to determine at least one threshold level that may be used by receiver (and/or decoder) circuitry 406 to decide the information level of the received bipolar return-to-zero signal (i.e., logical +1, logical −1, or logical zero) which may be optionally rectified by conventinal techniques (i.e., logical 1 or logical zero). Accordingly, the peak detector preferably operates to set the threshold at a point representing approximately the mid-point between a a reference level and a peak amplitude value achieved by the received signal.

According to the invention, the threshold level and received signal samples are selectively (408) routed to an analog-to-digital convertor 410, which provides representative digitized information to the controller 328. Using this information, the controller operates to determine some measure of signal variation. In the preferred embodiment, at least statistical variance information concerning the received signal is determined. Optionally, peak signal value, RMS value, average absolute value, or other such signal variation criteria may be used in accordance with the teachings of the present invention. In this way, the controller 328 may vary, program or otherwise adjust the equalizer 300 (via switch control lines a–g) in accordance with the variance information so as to set the equalizer to a setting corresponding to the minimum variance of the received signal. Those skilled in the art will appreciate that, ideally, signal variations (e.g., statistical variance) at the received signal zero-crossing should be zero (see FIG. 1). However, in a practical embodiment, the received signal will vary (i.e., a non-zero variance) at the peak and the zero-crossing area such that some non-zero determinable signal variation value can be determined. The present invention prefers to determine statistical variance information and vary, adjust, or program one or more operational parameters of the equalizer so as to equalize the received signal at the point of minimum signal variation. Although either sampling point (10 or 10') may be used, the sampling point 10' is preferred since the signal variation(s) (e.g., statistical variance) is more pronounced at the zero-crossings, and therefore, greater resolution in the setting of the equalizer may be achieved.

Figure 5A:
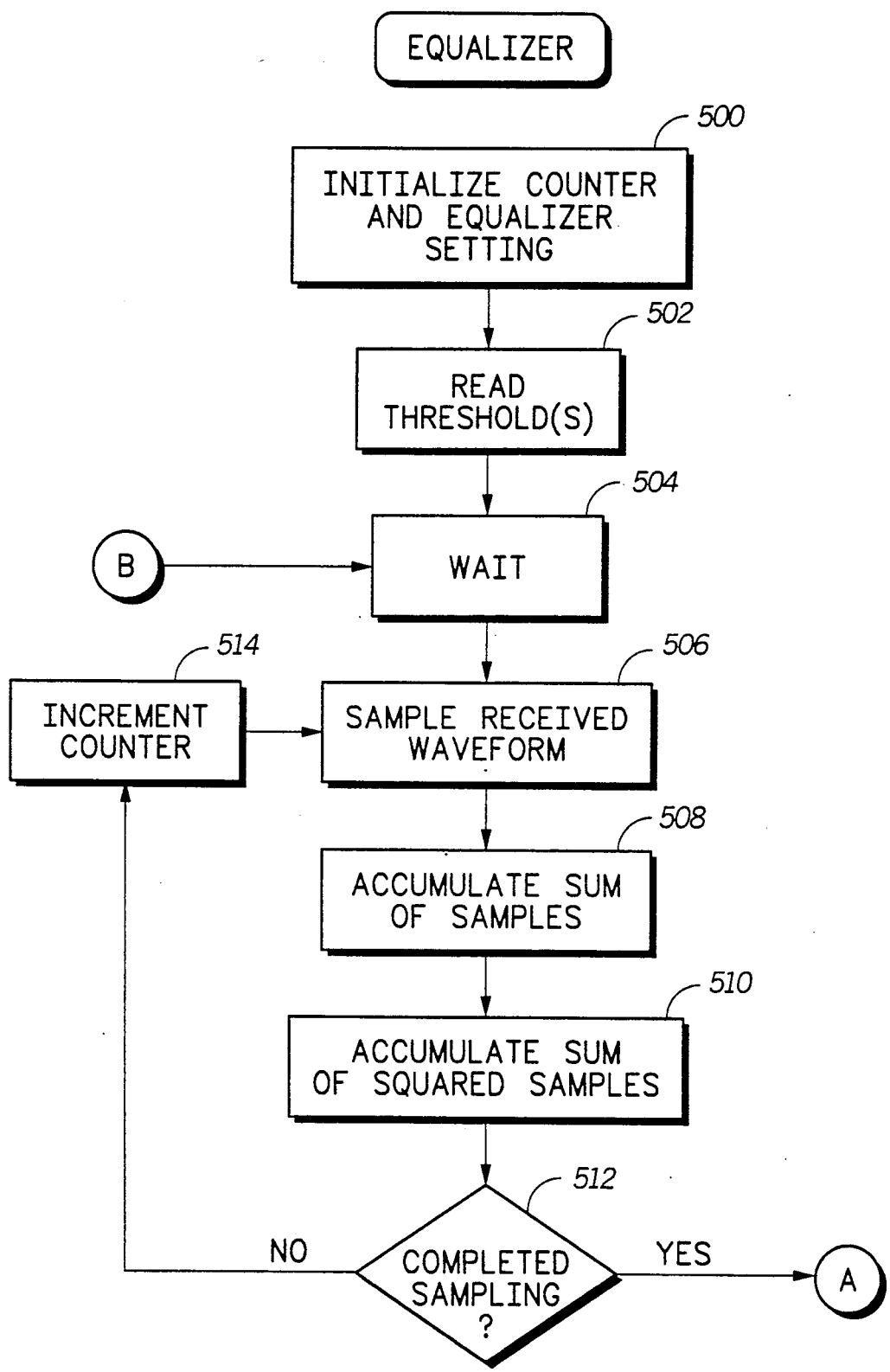
FIGS. 5a–5c are flow-diagrams illustrating the operation of the equalization system of FIG. 4.
Figure 5B:
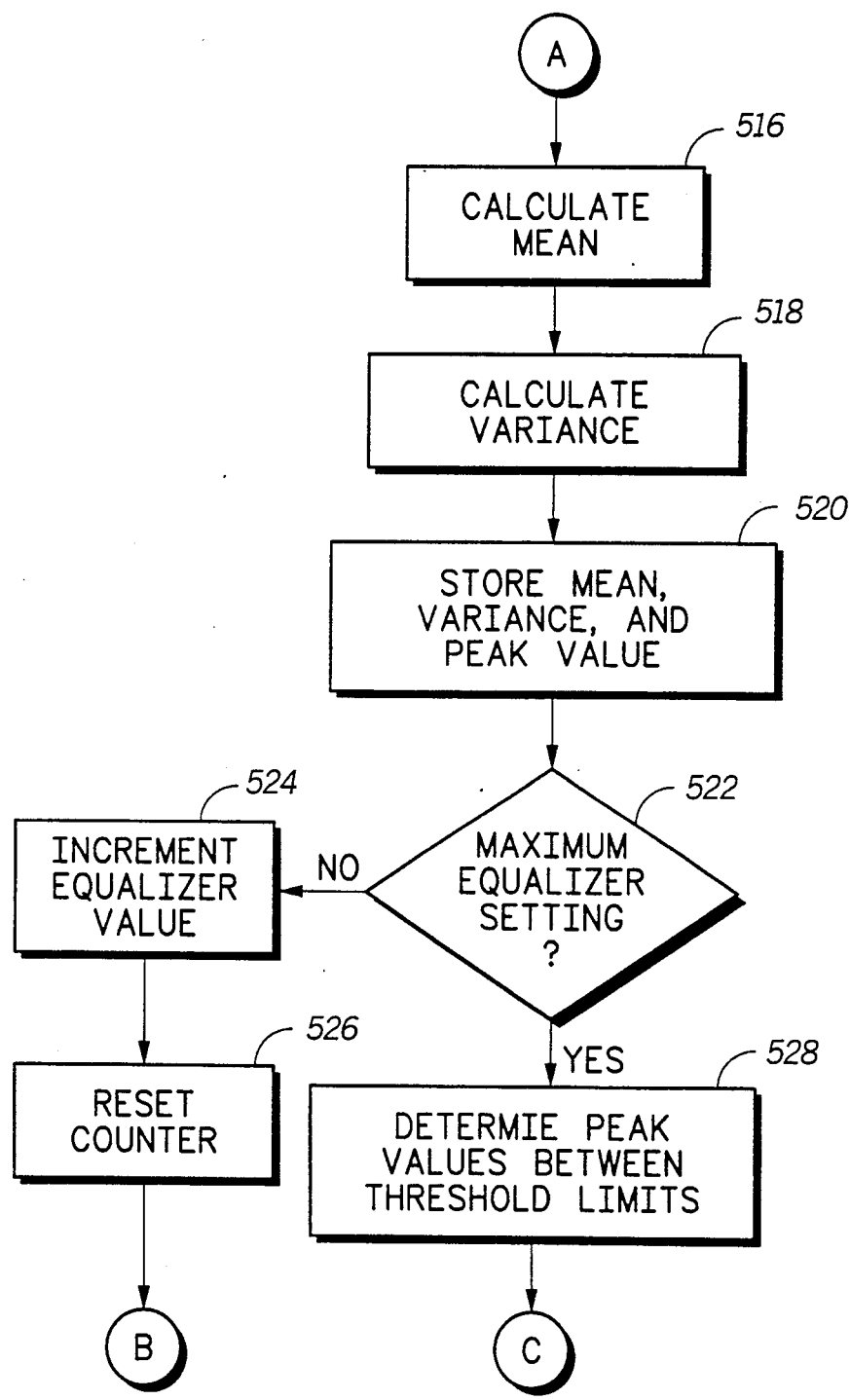
Figure 5C:
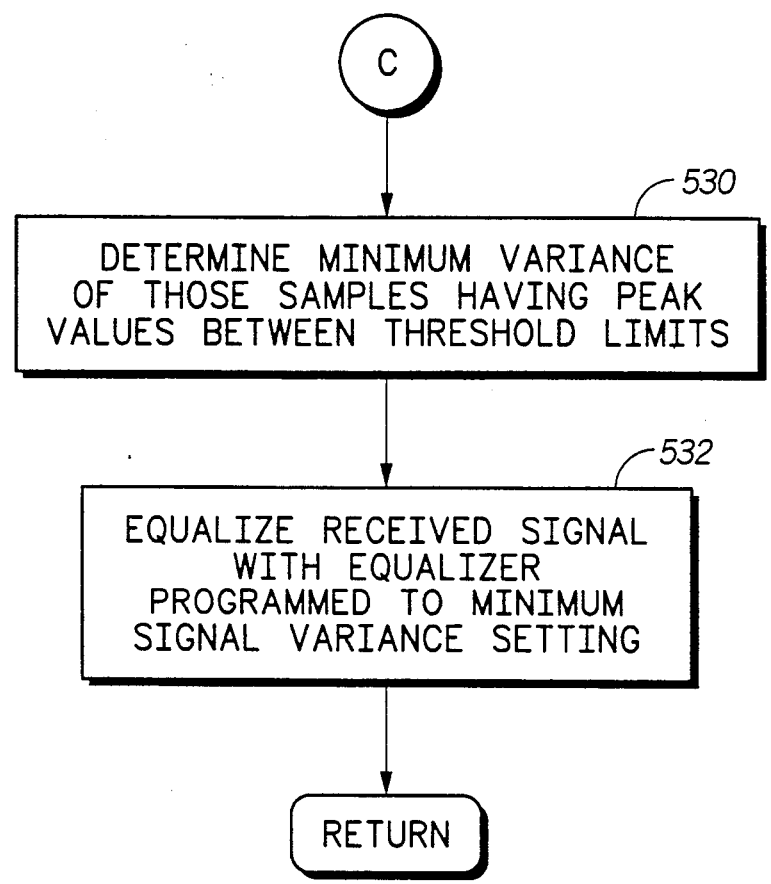

Referring to FIGS. 5a–5c, the operation of the equalization system of FIG. 4 may be explained. The procedure begins in step 500, where a counter and equalizer setting register are initialized (preferably to zero) using techniques known in the art. Following initialization, the threshold level is read by the controller 328 (step 502) as described in conjunction with FIG. 4. Next, a wait state (step 504) is executed to allow a proper settling time interval to pass before the received signal is sampled (preferably at the zero-crossing point 10') (step 506). Steps 508 and 510 respectively accumulate a sum of the sample values and a sum of the squared sample values. That is, the current sample is accumulated with prior samples to form a sum of the samples. Also, the sample is mathematically squared (i.e., (sample)$^2$) and accumulated with prior squared samples to form a sum of the squared samples. These accumulations will be later employed to determine the signal variation (i.e., statistical variance) information used to set the equalizer.

Decision 512 determines whether sampling is completed. According to the invention, a suitable number of samples must be taken in order to be able to accurately determine the bit error ratio of the received signal. If more samples are required, the counter is incremented and another sample is processed. Conversely, when sampling has been completed for the current equalizer setting (as determined by the equalizer setting register), the routine proceeds to FIG. 5b, where the statistical variance (step 518) is determined by applying known relationships to the sum of samples and sum of squared samples. After the signal variation information is known it is stored together with the peak value for the sample in any suitable memory or storage media.

The routine continues by decision 522 determining whether the variance information has been determined for all possible equalizer settings. If the maximum equalizer setting has not been reached, the equalizer setting register is incremented (step 524) and the counter is reset (step 526), before control is passed to step 514 to FIG. 5a. Conversely, if the received signal variation information is known for all equalizer settings, the stored peak value information is sorted (checked) to find those peak values between two threshold limits (step 528). For those samples having a peak value in accordance with step 528, the signal variation (preferably statistical variance) information associated with those samples are evaluated (step 530) and the equalizer 300 has one or more operational parameters programmed, varied, or adjusted (step 532) so as to operate to equalize received signals based upon the lowest (minimum) signal variation criteria found. By adjusting the equalizer 300 in this manner, the bit error rate (BER) of the received information is enhanced, corresponding to a more optimum equalizer setting than was heretofore available through conventional equalization techniques.

What is claimed is:

1. A method of equalizing a bipolar return-to-zero signal received from a communication channel, comprising the steps of:
   (a) equalizing said signal with an equalizing means based on a current operational parameter setting thereof to provide an equalized signal;
   (b) sampling the equalized signal at a plurality of zero-crossing times to provide corresponding signal samples;
   (c) processing the plurality of signal samples to determine signal variation information based on said current operational parameter setting of said equalizing means;
   (d) repeating steps (a), (b) and (c) for each of a plurality of different operational parameter settings to determine a corresponding plurality of signal variation informations; and
   (e) selecting an operational parameter setting of said plurality for use in equalizing said signal based on the determined signal variation informations of all said settings.

2. The method of claim 1, wherein step (c) further comprises processing the signal samples to determine statistical variance information.

3. The method of claim 1 wherein the step of selecting includes selecting the operational parameter setting corresponding to the minimum signal variation information of the determined plurality.

4. The method of claim 1 including the steps of:
(f) detecting a peak amplitude of each pulse waveform being sampled;
(g) determining a threshold value from each detected peak amplitude;
(h) determining a final threshold value based on the plurality of threshold values associated with the selected operational parameter setting of step (e), whereby said final threshold value is used to establish information levels of said equalized signal.

5. The method of claim 1 wherein the equalized signal is sampled at zero crossing times defined as occuring between bit intervals of pulse waveforms 1 and −1 absent an intervening empty (zero) bit interval.

6. A method of equalizing a bipolar return-to-zero signal received from a communication channel, comprising the steps of:
(a) equalizing said signal with an equalization means to provide an equalized signal;
(b) sampling the equalized signal at a plurality of zero-crossing times to provide corresponding signal samples;
(c) processing the plurality of signal information samples to determine signal variation information in the form of the statistical variance thereof;
(d) varying at least one operational parameter of said equalization means in accordance with the signal variation information so as to set the equalization means operating point in accordance with minimum signal variation spread.

7. The method of claim 6, wherein step (c) further comprises processing the signal information to determine peak value information.

8. The method of claim 7, wherein step (c) further comprises processing the signal information to determine signal variation information from signal information determined to reside within an range of the peak value information.

9. A signal equalization system for equalizing a bipolar return-to-zero signal received from a communication channel, said system comprising:
means for equalizing said signal based on a current operational parameter setting to provide an equalized signal;
means for sampling the equalized signal at a plurality of zero crossing times to provide corresponding signal samples for the current operational parameter setting of said equalizing means;
means for processing the plurality of signal samples to determine signal variation information based on said current operational parameter setting of said equalizing means; and
controller means for changing the operational parameter setting of said equalizing means to a new current setting after determining the corresponding signal variation information for said current setting said change being performed for each of a plurality of operational parameter settings; and
means for selecting an operational parameter setting from said plurality based on the determined signal variation informations of all said settings, whereby the selected setting is used by said equalizing means in equalizing said signal.

10. The system of claim 9 wherein the processing means includes means for processing the signal samples to determine statistical variance information.

11. The system of claim 9 wherein the selecting means includes means for selecting the operational parameter setting corresponding to the minimum signal variation information of the determined plurality.

12. The system of claim 9 including:
means for detecting a peak amplitude of each pulse waveform being sampled;
means for determining a threshold value from each detected peak amplitude; and
means for determining a final threshold value based on the plurality of threshold values associated with the selected operational parameter setting of step (e), whereby said final threshold value is used to establish information levels of said equalized signal.

13. The system of claim 9 wherein the sampling means samples the equalized signal at zero crossing times defined as occurring between bit intervals of pulse waveforms 1 and −1 absent an intervening imply (zero) bit interval.

14. A signal equalization system for equalizing a bipolar return-to-zero signal received from a communication channel, said system comprising:
means for equalizing said signal to provide an equalized signal;
means for sampling the equalized signal at a plurality of zero crossing times to provide corresponding signal samples;
means for processing the plurality of signal samples to determine signal variation information in the form of the statistical variance thereof; and
means for varying at least one operational parameter of said equalizing means in accordance with the signal variation information so as to set the equalizing means operating point in accordance with minimum signal variation spread.

15. The signal equalization system of claim 14, which includes means for receiving or decoding the received signal.

16. The signal equalization system of claim 14, which includes means for processing the signal information to determine peak value information.

17. The signal equalization system of claim 14, which includes means for processing the signal information to determine signal variation information from signal information determined to reside within an range of the peak value information.

* * * * *